US012779831B2

(12) United States Patent
Lee et al.

(10) Patent No.: US 12,779,831 B2
(45) Date of Patent: Nov. 3, 2026

(54) POLYESTER FILM AND PACKAGING MATERIAL

(71) Applicant: MICROWORKS CO., LTD., Iwol-myeon (KR)

(72) Inventors: Seokin Lee, Suwon-si (KR); Kweon Hyung Han, Suwon-si (KR)

(73) Assignee: MICROWORKS CO., LTD., Iwol-myeon (KR)

( * ) Notice: Subject to any disclaimer, the term of this patent is extended or adjusted under 35 U.S.C. 154(b) by 0 days.

(21) Appl. No.: 18/071,817

(22) Filed: Nov. 30, 2022

(65) Prior Publication Data

US 2024/0092069 A1 Mar. 21, 2024

(30) Foreign Application Priority Data

Sep. 13, 2022 (KR) ........................ 10-2022-0114862

(51) Int. Cl.

*B32B 27/36* (2006.01)
*B32B 7/02* (2019.01)
*B32B 27/18* (2006.01)

(52) U.S. Cl.

CPC ................ *B32B 27/36* (2013.01); *B32B 7/02* (2013.01); *B32B 27/18* (2013.01); *B32B 2270/00* (2013.01); *B32B 2307/7163* (2013.01); *B32B 2367/00* (2013.01)

(58) Field of Classification Search

CPC ..... B32B 1/02; B32B 27/36; Y10T 428/1352; Y10T 428/31786
USPC ................................................ 428/35.7, 480
IPC ............................... Y10T 428/1352,428/31786
See application file for complete search history.

(56) References Cited

U.S. PATENT DOCUMENTS

| | | | | |
|---|---|---|---|---|
| 6,808,795 | B2 * | 10/2004 | Noda | C08J 5/18 428/221 |
| 2007/0014977 | A1 * | 1/2007 | Graney | B32B 9/02 428/212 |
| 2008/0203599 | A1 * | 8/2008 | Isomi | B29C 45/37 264/69 |
| 2011/0244185 | A1 | 10/2011 | Dou et al. | |
| 2011/0244186 | A1 | 10/2011 | Dou et al. | |
| 2013/0065046 | A1 * | 3/2013 | Krishnaswamy | C08L 67/02 524/404 |
| 2013/0231440 | A1 * | 9/2013 | Alidedeoglu | C08L 69/00 524/537 |
| 2013/0295355 | A1 | 11/2013 | Lee et al. | |
| 2015/0132512 | A1 | 5/2015 | Krishnaswamy et al. | |
| 2015/0210803 | A1 * | 7/2015 | Alidedeoglu | C08G 63/183 524/379 |

(Continued)

FOREIGN PATENT DOCUMENTS

| | | | |
|---|---|---|---|
| CN | 109265943 | A | 1/2019 |
| CN | 109641427 | A | 4/2019 |

(Continued)

*Primary Examiner* — Aaron Austin
(74) *Attorney, Agent, or Firm* — NSIP Law

(57) ABSTRACT

A polyester film includes a laminate including a plurality of first layers and a plurality of second layers alternately stacked on the plurality of first layers. Each of the first layers includes lactic acid residues, and each of the second layers includes terephthalate residues and adipic acid residues. The polyester film has an average equivalent noise level of 78 dB or less from a noise level test for film spinning the polyester film 180 degrees at 800 rpm for 30 seconds or more, and has Young's modulus of 280 kgf/mm$^2$ or less.

11 Claims, 3 Drawing Sheets

(56) References Cited

U.S. PATENT DOCUMENTS

2019/0352485 A1* 11/2019 Yamamoto .............. C08L 23/14

FOREIGN PATENT DOCUMENTS

| | | | | |
|---|---|---|---|---|
| CN | 110062791 | A | | 7/2019 |
| CN | 114015025 | A | * | 2/2022 |
| EP | 1 348 541 | A1 | | 10/2003 |
| EP | 2583944 | A1 | * | 4/2013 |
| EP | 2 698 252 | A1 | | 2/2014 |
| JP | 2004010900 | A | * | 1/2004 |
| JP | 2006-181754 | A | | 7/2006 |
| JP | 5044749 | B2 | * | 10/2012 |
| JP | 2013-147580 | A | | 8/2013 |
| JP | 2013-541447 | A | | 11/2013 |
| JP | 2016-43650 | A | | 4/2016 |
| KR | 10-0904144 | B1 | | 6/2009 |
| KR | 10-2012-0041974 | A | | 5/2012 |
| KR | 10-2404216 | B1 | | 5/2022 |
| KR | 10-2022-0077166 | A | | 6/2022 |
| WO | WO 2007/008339 | A1 | | 1/2007 |
| WO | WO 2011/123682 | A1 | | 10/2011 |
| WO | WO 2014/206996 | A1 | | 12/2014 |

* cited by examiner

POLYESTER FILM AND PACKAGING MATERIAL

CROSS-REFERENCE TO RELATED APPLICATIONS

This application claims the benefit under 35 USC 119(a) of Korean Patent Application No. 10-2022-0114862 filed on Sep. 13, 2022, in the Korean Intellectual Property Office, the entire disclosure of which is incorporated herein by reference for all purposes.

BACKGROUND

1. Field

The present disclosure relates to a multilayer polyester film improved in the noise level.

2. Description of Related Art

Polylactide resin is eco-friendly because it is biodegraded within a relatively short time and is reusable with low harmful ingredients.

However, such a polylactide resin causes very loud noise when shaped into a film, and this characteristic has been considered a limitation in actual commercialization.

To mitigate such a weakness of the polylactide resin, a method of applying a polylactic acid to the polylactide film by blending with aliphatic-aromatic copolyesters to give flexibility to the film has been devised; however, in such a case, due to low compatibility of the polylactic acid and the aliphatic-aromatic copolyesters, transparency of the final film is remarkably degraded, and it leads to the difficulty of using the film as a wrapping material requiring transparency.

The background art described above is technological information kept by inventors for deriving the present invention or obtained during the deriving process of the present invention, and it cannot be necessarily considered as noticed technology opened to general people before the application of the present invention.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a polyester film includes a laminate including a plurality of first layers and a plurality of second layers alternately stacked on the plurality of first layers. Each of the first layers includes lactic acid residues, and each of the second layers includes terephthalate residues and adipic acid residues. The polyester film has an average equivalent noise level of 78 dB or less from a noise level test for film spinning the polyester film 180 degrees at 800 rpm for 30 seconds or more, and has Young's modulus of 280 $kgf/mm^2$ or less.

The polyester film may have a noise level of 63 dB or less at 250 Hz from the noise level test when the laminate has a thickness of 16 μm.

The polyester film may have a haze of 10% or less.

The polyester film may have a noise level of 53 dB or less at 500 Hz from the noise level test when the laminate has a thickness of 16 μm.

The laminate may have 30 layers or more of the first layers and the second layers.

Each of the first layers may further include hydroxyalkanoate residues.

The hydroxyalkanoate residues may be in an amount of 1 to 7 parts by weight based on the lactic acid residues of 100 parts by weight, and each of the second layers may further include a polybutylene adipate-co-terephthalate resin.

Each of the first layers and each of the second layers may have a ratio of 1:0.2 to 1.5.

The polyester film may further include a skin layer disposed on opposing sides of the laminate. The skin layer may include a first resin comprising lactic acid residues, and inorganic particles.

In another general aspect, a polyester film includes a laminate including a plurality of first layers and a plurality of second layers alternately stacked on the plurality of first layers. Each of the first layers includes lactic acid residues, and each of the second layers including terephthalate residues and adipic acid residues. The polyester film has a noise level of 80 dB or less at 250 Hz, 500 Hz, 1000 Hz, 2000 Hz, 4000 Hz and 8000 Hz, when a noise level test for film spinning the polyester film 180 degrees at 800 rpm for 30 seconds or more.

A packaging material may include the polyester film described herein.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
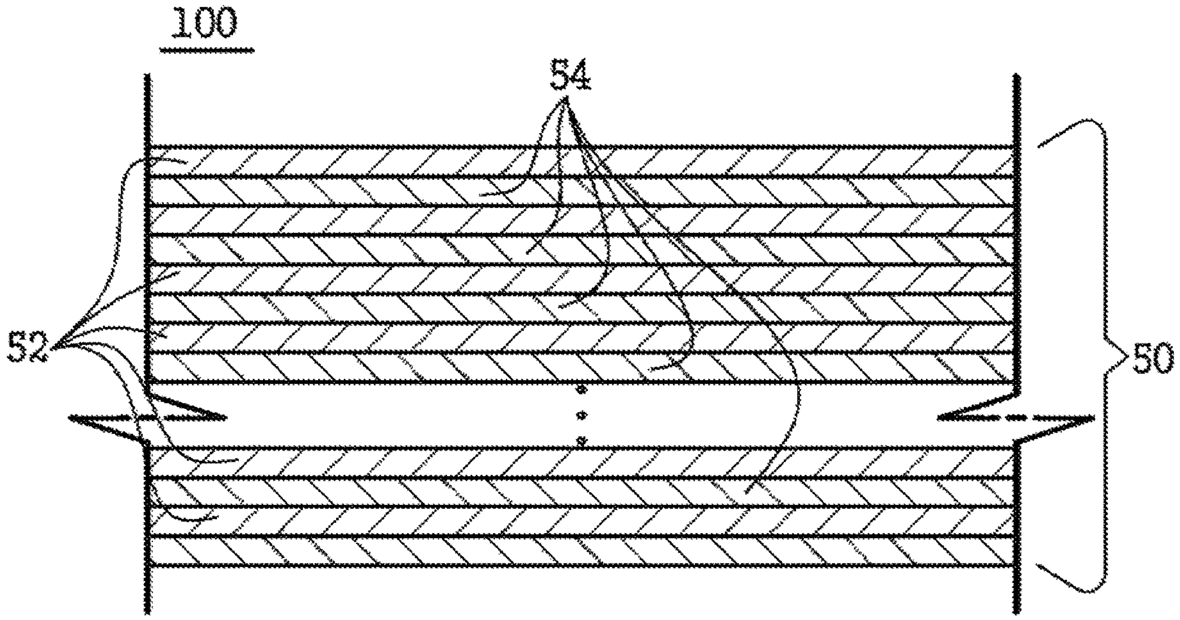
FIG. 1, FIG. 2A, and FIG. 2B are conceptual views illustrating an example of a polyester film according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The present disclosure aims to provide a polyester film with an improved noise level, transparence, and a biodegrading characteristic. Another objective of the present disclosure is to provide a packaging material, including polyester film.

The present disclosure can provide a polyester film or the like having a biodegradable characteristic and a decreased level of the occurrence of noise. The present disclosure can provide a polyester film, which is eco-friendly and relatively transparent, having a mechanical strength and flexibility of a proper level or more, while reducing the occurrence of noise in audible frequency (hearing range of people), for example, in a low-pitched sound range, and a packaging material utilizing the same.

A polylactic resin, a representative degradable polymer, becomes notable as an alternative film material to a conventional petroleum-based polyester film. However, a film applied with the polylactic resin causes a relatively loud crackling sound when used as a wrapping material, which may be a disadvantage when using the film as a packaging material. When a film containing a polylactic resin is used as a packaging material for food that is ready to be consumed, such as plastic bags for biscuits, cookies, snacks, and bread, the crackling sound may dissuade a user as the noise causes an unpleasant sense.

Noise is a target to be decreased in addition to being a social problem causing noise pollution. Besides, a consumer may be unwilling to buy a product generating loud sounds unnecessarily, and thus it is important to provide a degradable film that does not cause unnecessary noise when substituting a degradable film for a conventional film based on petroleum chemistry to target eco-friendly objectives.

The inventors disclose the manufacture of a film with a low-level occurrence of noise while obtaining a degradable characteristic in the present disclosure. In addition, the inventors have decreased the occurrence of crackling sound from a degradable polyester film and obtained mechanical strength of a certain level or more for the film through embodiments, have verified the film has excellent characteristics to be utilized as a packaging material for food or more, and disclose the present disclosure.

Figure 2A:
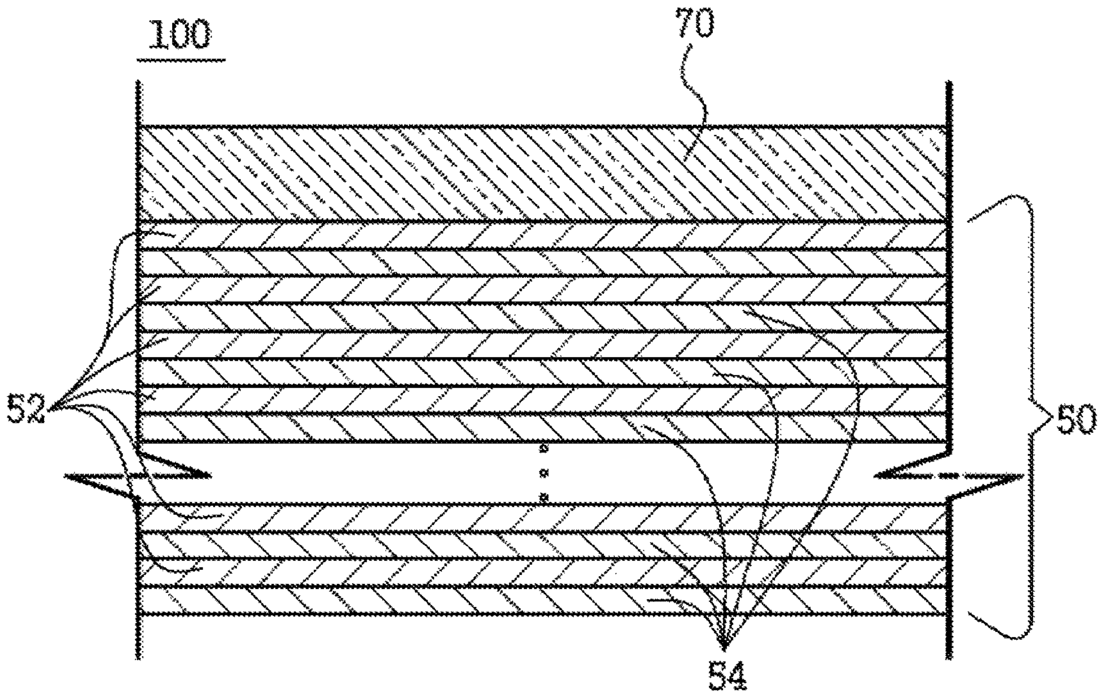
Figure 2B:
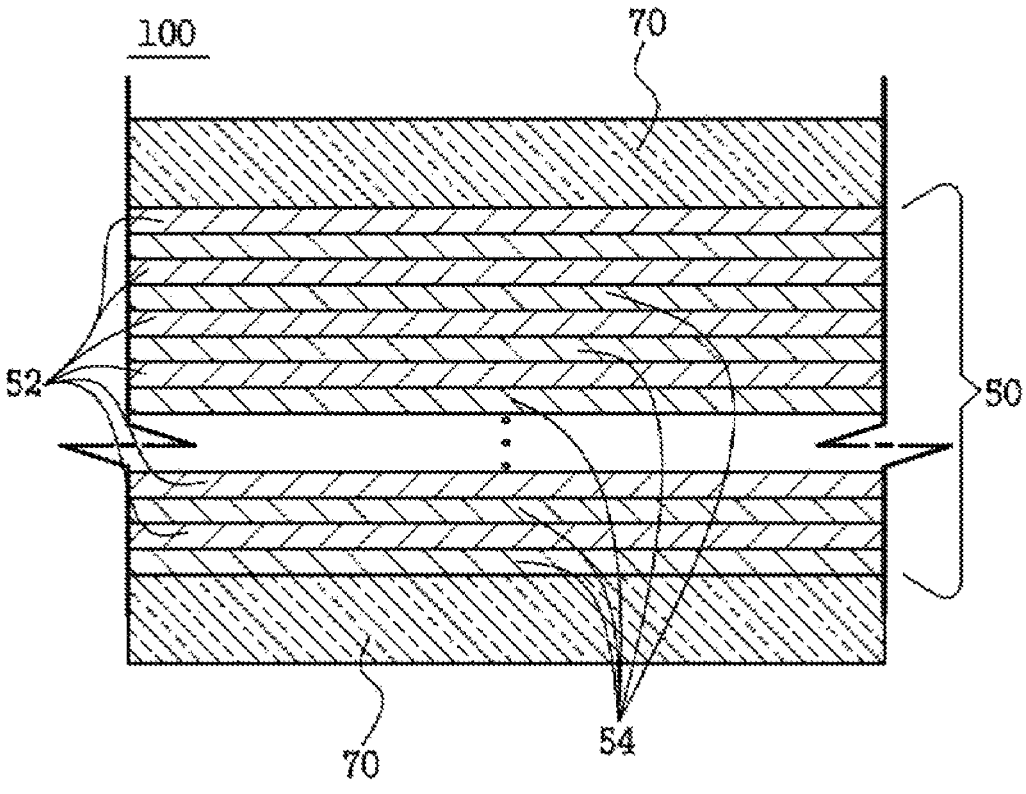
Figure 3:
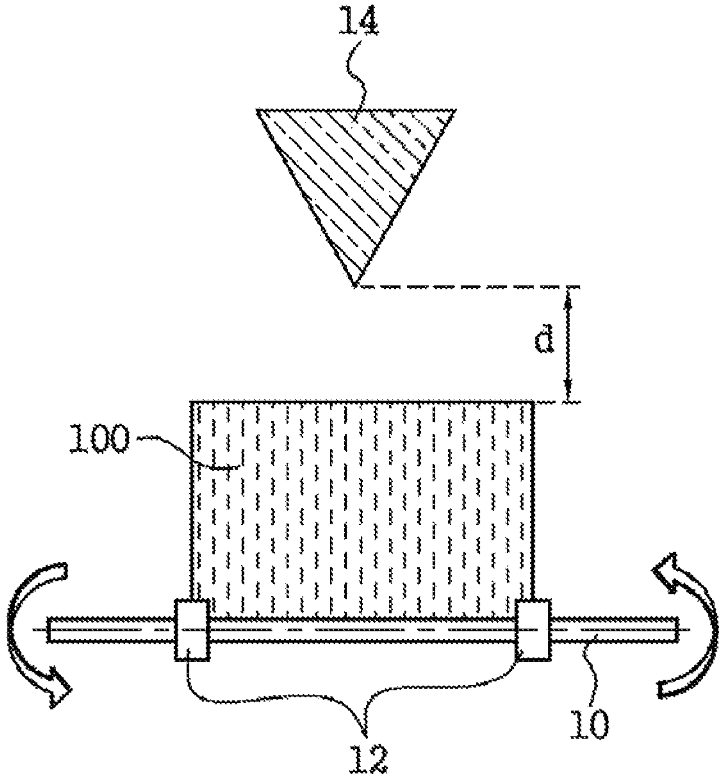
FIG. 3 is a conceptual view for illustrating a method of measuring noise applied to a noise level test of the embodiments.

FIG. 1, FIG. 2A, and FIG. 2B are conceptual views for illustrating an example of a polyester film according to one or more embodiments. FIG. 3 is a conceptual view for illustrating a method of measuring noise that is applied to a noise level test of embodiments. Hereinafter, with reference to FIG. 1 to FIG. 3, the present disclosure is described in further detail.

A polyester film 100, according to one embodiment, comprises a laminate 50 in which a first layer 52 comprises lactic acid residues; and a second layer 54 comprising terephthalate residues and adipic acid residues have been alternately laminated (Refer to FIG. 1).

A polyester film 100, according to another embodiment, comprises a laminate 50 described above and a skin layer 70 disposed on one side or both sides of the laminate (Refer to FIG. 2A and FIG. 2B).

Laminate

The laminate 50 is a laminate in which the first layer and the second layer are alternately laminated, wherein the first layer and the second layer contains polymer resins distinguished from each other.

The first layer 52 comprises lactic acid residues.

The first layer 52 may comprise a polylactic acid-based resin (PLA-based resin).

The polylactic acid-based resin is based on biomass, different from a resin based on petroleum, and helpful for suppressing carbon dioxide emissions. Besides, due to a biodegradable characteristic, when the polylactic acid-based resin is buried, degradation thereof can be rapidly made by moisture and micro-organisms, compared to a resin based on petroleum. Accordingly, it is an eco-friendly material.

The polylactic acid-based resin may be comprised in an amount of 50 wt % or more, 80 wt % or more, 85 wt % or more, 90 wt % or more, 93 wt % or more, 95 wt % or more or 97 wt % or more based on the whole of the first layer. Also, the resin may be comprised in an amount of 99.9 wt % or less or 99 wt % or less.

The polylactic acid-based resin may comprise L-lactic acid residues, D-lactic acid residues, L-D-lactic acid residues, or a combination thereof.

In the polylactic acid-based resin, the amount of L-lactic acid residues may be 80 mol % or more, 83 mol % or more, 85 mol % or more, 88 mol % or more, 90 mol % or more or 92 mol % or more based on the whole of the polylactic acid-based resin. Also, the amount of L-lactic acid may be 99 mol % or less, 97 mol % or less, 95 mol % or less, or 93 mol % or less. In such a case, the heat resistance characteristic of the film can be improved further.

In the polylactic acid-based resin, the amount of D-lactic acid residues may be more than 0 mol %, 0.5 mol % or more, or 1 mol % or more based on the whole of the polylactic acid-based resin. Also, the amount of D-lactic acid may be 5 mol % or less, or 3 mol % or less. In such a case, the processability for stretching the film can be improved further.

The polylactic acid-based resin may have a weight average molecular weight (Mw) of 100,000 to 1,000,000 g/mol, for example, of 100,000 to 800,000 g/mol, 100,000 to 500,000 g/mol, or 100,000 to 300,000 g/mol. The weight average molecular weight (Mw) may be measured by Gel Permeation Chromatography (GPC). When the weight average molecular weight (Mw) of the polylactic acid satisfies the above range, it can help improve the film's mechanical properties.

The first layer 52 may comprise hydroxyalkanoate residues further.

The hydroxyalkanoate residues may be derived from polyhydroxyalkanoates resin (PHA resin).

The first layer 52 may comprise a polylactic acid-based resin and a polyhydroxyalkanoates resin.

The polyhydroxyalkanoates resin is a semi-crystalline thermoplastic polyester compound that is generable by chemical synthesis or micro-organisms (e.g., bacteria or algae) and utilized to manufacture biodegradable plastic.

The polyhydroxyalkanoates resin may comprise one or more residues selected from the group consisting of poly[3-hydroxybutylate] (P3-HB); poly[4-hydroxybutylate] (P4-HB); poly[3-hydroxyvalerate] (PHV); poly[3-hydroxybutylate]-co-poly[3-hydroxyvalerate] (PHBV); poly[3-poly[3-hydroxyhexanoate] (PHC); poly[3-hydroxyheptanoate] (PHH); poly[3-hydroxyoctanoate] (PHO); poly[3-hydroxynonanoate] (PHN); poly[3-hydroxydecanoate] (PHD); poly[3-hydroxydodecanoate] (PHDD); and poly[3-hydroxy tetradecanoate] (PHTD).

Specifically, the polyhydroalkanoates resin may comprise any one selected from the group consisting of 3-hydroxybutylate residues (3HB residues), 4-hydroxybutylate residues (4HB residues) and combinations thereof.

The polyhydroxyalkanoates resin may comprise 3HB residues in an amount of 50 mol % or more, 55 mol % or more, or 60 mol % or more based on the whole of the polyhydroxyalkanoates resin. The resin may comprise the residues in an amount of 100 mol % or less, 80 mol % or less or 70 mol % or less.

The polyhydroxyalkanoates resin may comprise 4HB residues in an amount of 50 mol % or less, 45 mol % or less or 40 mol % or less based on the whole of the polyhydroxyalkanoates resin. The resin may comprise the residues in an amount of 0 mol % or more, 20 mol % or more or 30 mol % or more.

The polyhydroxyalkanoates resin may comprise both 4HB residues and 3HB residues, and may comprise 4HB residues in an amount of 30 mol % to 35 mol % based on the whole of the polyhydroxyalkanoates resin. In such a case, adjusting the crystallinity of the film can help improve the mechanical properties of the film.

The first layer 52 may be manufactured by applying a resin blended with the polylactic acid-based resin and the polyhydroxyalkanoates resin. Through the above, the first layer 52 can help give biodegradability of a certain level or more and proper mechanical properties to the polyester film.

The hydroxyalkanoate residues comprised in the first layer 52 may be an amount of 1 to 7 parts by weight or 2 to 6 parts by weight based on the lactic acid residues of 100 parts by weight. When a resin having the residues is applied, it can strengthen the film and help control crystallinity during a biaxial stretching process. In addition, it can adjust the properties of the first layer, which is relatively hard and thereby can provide a film with decreased noise.

A resin applied to the first layer 52 may have a melt viscosity of 5,000 P or more, or 7,000 P or more. The melt viscosity may be 14,000 P or less, or 12,000 P or less. In such a case, stable workability can be obtained when a laminate is manufactured by an extruding method.

The first layer 52 may comprise inorganic particles further. The inorganic particles, for example, may function as an anti-blocking agent, but the use of the inorganic particles is not limited thereto.

The inorganic particles applied to the first layer may comprise for example, silica ($SiO_2$), calcium carbonate ($CaCO_3$), indium tin oxide (ITO), aluminum hydroxide ($Al_2(OH)_3$), zinc oxide (ZnO), titanium dioxide ($TiO_2$), or barium sulfate ($BaSO_4$).

In the inorganic particles, $D_{50}$ may be 1 μm or more, or 1.5 μm or more. The $D_{50}$ may be 3 μm or less, or 2 μm or less.

The inorganic particles may be comprised in an amount of 2,000 ppm or less, or 1,500 ppm or less to a first layer based on the whole of the first layer or a skin layer based on the whole of the skin layer. When the inorganic particles are comprised in the skin layer, it may function as an anti-blocking agent.

In addition, when the first layer comprises inorganic particles containing calcium carbonate, it can help reduce the occurrence of noise from a polyester film.

The first layer 52 may comprise an ordinary electrostatic generating agent, anti-charging agent, anti-oxidizing agent, heat stabilizer, UV blocking agent, anti-blocking agent, or combinations thereof further as needed.

The second layer 54 may comprise terephthalate residues and adipic acid residues.

The second layer 54 has an aliphatic-aromatic copolyesters-based resin as a main ingredient, and specifically comprises adipic acid residues and terephthalate residues.

The aliphatic-aromatic copolyesters-based resin may comprise aliphatic dicarboxylic acid residues as adipic acid and aromatic dicarboxylic acid residues as terephthalic acid, and may comprise glycol residues further.

The aliphatic dicarboxylic acid may comprise for example, a succinic acid, a sebacic acid, a glutaric acid, a malonic acid, an oxalic acid, an azelaic acid, or a nonane dicarboxylic acid, further.

The aromatic dicarboxylic acid may comprise, for example, an isophthalic acid, naphthalene-2,6-dicarboxylic acid, diphenylsulfone dicarboxylic acid, diphenylether dicarboxylic acid, diphenoxyethane dicarboxylic acid, or cyclohexane dicarboxylic acid, further.

The glycol residues may be any one type of residue selected from the group consisting of alkylene glycols such as ethylene glycol, 1,3-propanediol, 1,4-butanediol, 1,5-pentanediol, 1,6-hexanediol, propylene glycol, neopentyl glycol, 2-methyl-1,3-propanediol, and diethylene glycol; and 1,4-cyclohexanediol; 1,4-cyclohexanedimethanol; polyethylene glycol; and mixtures thereof.

A resin comprised in the second layer 54 may comprise aliphatic ingredients in an amount of 30 mol % or more, 40 mol % or more, 45 mol % or more, or 50 mol % or more based on the whole of the acid ingredients. Also, the aliphatic ingredients may be 80 mol % or less, 70 mol % or less, or 60 mol % or less. In such a case, the biodegradable characteristic of a polyester film can be improved further.

The resin applied to the second layer 54 may be, for example, polybutylene adipate terephthalate (PBAT) resin, and in such a case, the resin can help to decrease the noise level and increase workability during the process of manufacturing a film.

The resin applied to the second layer 54 may have a melt viscosity of 3,000 P or more, or 4,000 P or more at 210° C. The melt viscosity may be 9,000 P or less, or 7,000 P or less at 210° C. In such a case, stable workability can be obtained when a laminate is manufactured by an extruding method.

The aliphatic-aromatic copolyesters-based resin may have a weight average molecular weight (Mw) of 50,000 to 400,000 g/mol, for example, a value of 50,000 to 300,000 g/mol, 50,000 to 200,000 g/mol, or 50,000 to 100,000 g/mol. The weight average molecular weight (Mw) may be measured by Gel Permeation Chromatography (GPC). In such a case, the resin can have excellent compatibility with a resin applied to the first layer while having great workability.

The second layer 54 may comprise an ordinary electrostatic generating agent, anti-charging agent, anti-oxidizing agent, heat stabilizer, UV blocking agent, anti-blocking agent, and combinations thereof further as needed.

The second layer 54 has a flexible characteristic compared to the first layer 52.

The first layer, which is relatively hard, and the second layer, which is relatively flexible are alternately laminated to form a laminate 50. By the first layer, mechanical properties of the laminate can be maintained overall at a certain level or more, and the occurrence of noise can be decreased in a process of using a film made from the laminate through interaction of the first layer and the second layer. Compared to a polylactic film, a film whose equivalent noise level and noise level in low-pitched sound range are significantly decreased can be provided.

In addition, due to lamination with multilayers of the laminate, the optical properties of a polyester film can also be enhanced, When a resin applied to the first layer and a resin applied to the second layer are blended for making films, a film formed in the above manner has a characteristic of lowering a haze value compared to a film formed with monolayer. Accordingly, the present disclosure can provide a film with excellent light transmission.

A total layer number of layers in the laminate 50 may be 4 or more, 6 or more, 10 or more, 30 or more, 34 or more, or 36 or more. The laminate may have layers in a total number of 424 or less, 324 or less, or 224 or less. The total layer number of layers in the laminate is based on the number of layers determined in the supposition that a first layer is present on the laminate, when the same resin as the resin of the first layer is applied to a skin layer described below and, therefore the first layer and the neighboring skin layer are difficult to be distinguished from each other.

The laminate 50 is formed by the first layer 52 and the second layer 54 alternately laminated to be a multilayer structure, and through the above, it is possible to provide a multilayer polyester film improved in the noise level in addition to maintaining a mechanical strength in a proper level or more.

The laminate may be one formed by the first layer and the second layer alternately laminated to have 36 layers or more, or to have layers in a total number of 36 to 144. In such a case, noise caused when a polyester film is applied to the use of an ordinary plastic bag like a snack bag can be substantially decreased.

From the laminate 50, the average thickness of the first layer 52 and the average thickness of the second layer 54 may have a ratio of 1:0.2 to 1.5. The average thickness ratio of the first layer and the second layer may be a value of 1:03 to 1.3. When the average thickness ratio of respective layers of the first and second layers satisfies the above range, the effect of noise reduction can be obtained in addition to maintenance of a film strength in a proper level or more.

The laminate 50 has an eco-friendly characteristic because substantially complete biodegradation can be made when after a predetermined time in an environment with bio-organisms and moisture.

The laminate 50 may have an average equivalent noise level of 78 dB or less in a noise level test for a film that spins the polyester film 180 degrees at 800 rpm for 30 seconds or more. The average equivalent noise level may be 77.5 dB or less, 76 dB or less, 74.5 dB or less, or 73 dB or less. The average equivalent noise level may be 72 dB or more.

The noise level test for a film was measured by utilizing a noise analyzer 14. A measuring sample film (or laminate) was cut into the size of A4. The long end of the sample is held and fixed by a fixing unit (12 e.g., jig) to a bar 10 arranged in a box blocking the external noise, and the bar is spined to generate noise of the film. The distance (d) of about 10 cm is applied between the end where a measuring unit of the noise analyzer has been disposed and the film. As for generation of noise, a noise level caused by spinning of 180 degrees for the bar at a speed of 800 RPM is measured, and at this time, the spinning is sustained for 30 seconds or more (Refer to FIG. 3).

For example, a film cut into the size of A4 is prepared and placed in a box of 650(W)*450(D)*500(H) mm made from polycarbonate, and a digital noise analyzer (model: CR-162C) available from Cirrus Research PIC is disposed (Refer to FIG. 3). The noise analyzer is placed at a distance of about 10 cm, a jig holds both ends of the film, and noise is measured by spinning the film 180 degrees to generate noise, maintained for 30 seconds or more at 800 RPM. Analysis of data is based on the application of NoiseTools Software program. On the program, the noise level at each certain frequency for 30 seconds, equivalent noise level, and the like can be evaluated. For example, the noise level and equivalent noise level in the range of 31.5 Hz to 16,000 Hz can be measured.

The test of the average equivalent noise level is based on a value measured from any one thickness selected within the scope of 15 μm to 30 μm for the laminate or the polyester film.

The laminate 50 may have a noise level of 63 dB or less, 62 dB or less, 61 dB or less, or 60 dB or less at 250 Hz from the film noise level test, when having a thickness of 16 μm.

This means that the laminate has a relatively low noise level at a frequency with a low-pitched sound.

The laminate 50 may have a noise level of 53 dB or less, 52 dB or less, 51 dB or less, or 50 dB or less at 500 Hz from the film noise level test, when having a thickness of 16 μm. This means that a relatively low-pitched sound range's noise level, which affects people's perception of noise, has a low value.

The laminate 50 may have a noise level of 59 dB or less, 57 dB or less, 56 dB or less, 55 dB or less at 1,000 Hz from the noise level test for a film, when having the thickness of 16 μm. This means that the noise level of a relatively low-pitched sound range is low.

The laminate 50 may have a noise level of 67 dB or less, 66 dB or less, 65 dB or less, 64 dB or less, or 63.5 dB or less at 2,000 Hz from the noise level test for a film, when having the thickness of 16 μm. This is noise at a frequency which is perceivable as loud sound for people in ordinary cases and means that the noise level has been substantially decreased.

The laminate 50 may have a noise level of 75 dB or less, 74 dB or less, 73 dB or less, 72 dB or less, or 71 dB or less at 4,000 Hz from the noise level test for a film, when having the thickness of 16 μm. This is noise at a frequency which is perceivable as loud sound for people in ordinary cases and the noise in a range causing the loudest noise from a film, and means that the noise level has been substantially decreased.

The laminate 50 may have a noise level of 72 dB or less, 71 dB or less, 70.5 dB or less, 70 dB or less, 69 dB or less, or 68 dB or less at 8,000 Hz, when having the thickness of 16 μm. This means that the occurrence of noise in a relatively high-pitched sound range has been decreased.

The laminate 50 may have a noise level of 63 dB or less, 62 dB or less, 60 dB or less, or 58 dB or less at 16,000 Hz, with a thickness of 16 μm. This means that the occurrence of noise in a high-pitched sound range has been decreased.

The laminate 50 may have a haze of 10% or less, 9% or less, or 8% or less. The haze may be 2% or more or 4% or more. This is a haze value within suitable optical properties, which has a level sufficient to be applied as a packaging material, and this is a desired characteristic compared to the case of simply blending a resin having lactic acid residues and an aliphatic-aromatic copolyesters resin. When the above two resins are simply blended, the blended resin becomes blurry and hazy, a phenomenon caused by the low compatibility of both resins. The present disclosure applies a laminate structure, and thereby can obtain excellent optical properties, while suppressing degradation of optical properties, which may be caused by the low compatibility of both resins. The haze is based on a value measured by using Hazemeter (model: SEP-H) available from Nihon Semitsu Kogaku.

Skin Layer

A polyester film 100 of an embodiment may comprise a skin layer 70.

The skin layer 70 may be disposed on one side or the other side of the laminate (Refer to FIG. 2A).

The skin layer 70 may be respectively disposed on one side or the other side of the laminate (Refer to FIG. 2B).

The skin layer 70 may contain the same resin as the resin applied to the first layer 52. The skin layer 70 may contain the same resin as the resin applied to the second layer 54. In such a case, the workability of manufacturing a polyester film can be improved further, and a biodegradable characteristic can be given to the film overall.

When the resin of the first layer is applied, the skin layer 70 can improve mechanical properties, workability, and the like of the polyester film.

The skin layer 70 may comprise inorganic particles, like the first layer, and an additive may be applied thereto as needed, as same as described above.

The skin layer 70 may have a thickness ratio of 5 to 25 to the thickness of the laminate 50 designated as 100. The thickness of the skin layer 70 may be 0.8 μm or more, 1.2 μm or more, or 2 μm or more, and the supremum of the thickness is not specially limited.

When the skin layer is applied to both upper and lower portions of the laminate, the thickness of the skin layer described in the above refers to the thickness of a skin layer at one portion.

When the skin layer 70 is applied to the polyester film 100, it is possible to provide a film whose feel, anti-slipping characteristic, and the like have been controlled overall, in addition to having an excellent strength on the film surface.

Polyester Film

The polyester film 100 of an embodiment may have an average equivalent noise level of 78 dB or less from a noise level test for a film that spins the polyester film 100 180 degrees at 800 rpm for 30 seconds. The average equivalent noise level may be 77.5 dB or less, 76 dB or less, 74.5 dB or less, or 73 dB or less. The average equivalent noise level may be 72 dB or more.

For example, based on the thickness of about 25 μm, when the measurement is performed under all the same measuring conditions for respective films, the average equivalent noise level of ordinary polyester films based on a petroleum-based material is about 80.3 dB, and the average equivalent noise level of polyester films applied with a polylactide resin is a value of about 83 to 85 dB, having a difference from the ordinary polyester film.

The average equivalent noise level of the embodiment means the occurrence of noise is substantially suppressed or decreased while a biodegradable polymer such as a polylactic acid resin is applied. That is, the present disclosure can provide a biodegradable polyester film whose noise is suppressed more than a polyester film (based on a petroleum-based material), which is applied as a packaging material of a product or the like.

The average equivalent noise level test or the noise level test is based on a value measured from any one thickness of the laminate or the polyester film, selected within the scope of 10 μm to 30 μm.

The polyester film 100 of an embodiment may have a noise level of 63 dB or less, 62 dB or less, 61 dB or less, or 60 dB or less at 250 Hz from the noise level test for a film. This means that a relatively low noise level is shown at a frequency indicating a low-pitched sound.

The polyester film 100 of an embodiment may have a noise level of 53 dB or less, 52 dB or less, 51 dB or less, or 50 dB or less at 500 Hz from the noise level test for a film. This means that the noise level of a relatively low-pitched sound range, perceivable as loud sound for people, is low.

The polyester film 100 of an embodiment may have a noise level of 59 dB or less, 57 dB or less, 56 dB or less, or 55 dB or less at 1,000 Hz from the noise level test for a film. This means that the noise level of a relatively low-pitched sound range is low.

The polyester film 100 of an embodiment may have a noise level of 67 dB or less, 66 dB or less, 65 dB or less, or 64 dB or less, or 63.5 dB at 2,000 Hz from the noise level test for a film. This is noise at a frequency which is perceivable as loud sound for people in ordinary cases and means that the noise level has been substantially decreased.

The polyester film 100 of an embodiment may have a noise level of 75 dB or less, 74 dB or less, 73 dB or less, 72 dB or less, or 71 dB or less at 4,000 Hz from the noise level test for a film. This is noise at a frequency which is perceivable as loud sound for people in ordinary cases and the noise in a range causing the loudest noise from a film, and means that the noise level has been substantially decreased.

The polyester film 100 of an embodiment may have a noise level of 72 dB or less, 71 dB or less, 70.5 dB or less, 70 dB or less, 69 dB or less, or 68 dB or less at 8,000 Hz. This means that the occurrence of noise in a relatively high-pitched sound range has been decreased.

The polyester film 100 of an embodiment may have a noise level of 63 dB or less, 62 dB or less, 60 dB or less, or 58 dB or less at 16,000 Hz. This means that the occurrence of noise in a relatively high-pitched sound range has been decreased.

The polyester film may have a haze of 10% or less. Also, the haze of the polyester film may have a value of 6.5% to 9.5%. Also, the haze of the polyester film may have a value of 7% to 9%. When having the haze range like the above, the polyester film can be transparent and be used for various uses requiring a light-transmitting characteristic. The haze was measured using Hazemeter (model: SEP-H) available from Nihon Semitsu Kogaku.

The polyester film 100 of an embodiment may have Young's modulus of 280 $kgf/mm^2$ or less. The Young's modulus is based on a value measured in accordance with ASTM D882, and refers to the average Young's modulus, which is the average value of a value measured in TD direction as the width direction of a film and a value measured in MD direction as the length direction of a film.

The Young's modulus may be 280 $kgf/mm^2$ or less, 275 $kgf/mm^2$ or less, 270 $kgf/mm^2$ or less, 220 $kgf/mm^2$ or less, 200 $kgf/mm^2$ or less, or 160 $kgf/mm^2$ or less. The Young's modulus may be 80 $kgf/mm^2$ or more, 100 $kgf/mm^2$ or more, 120 $kgf/mm^2$ or more, 125 $kgf/mm^2$ or more, or 150 $kgf/mm^2$ or more. The Young's modulus is one of indices indicating flexibility of a polyester film, and a flexible film may be considered as one with a low noise level, however, as the result of repetitive experiments of the inventors, the fluctuation of Young's modulus and the degree of the occurrence of noise do not necessarily have a regular correlation. However, this shows that a film has a more flexible characteristic overall.

The polyester film 100 of an embodiment may have a tensile strength of 3 $kgf/mm^2$ or more, 4 $kgf/mm^2$ or more, 5 $kgf/mm^2$ or more, or 7 $kgf/mm^2$ or more, or 17 $kgf/mm^2$ or less. The tensile strength may be 15 $kgf/mm^2$ or less, or 12 $kgf/mm^2$ or less. When the tensile strength has different values in MD direction and TD direction, the tensile strength refers to the average value thereof. The polyester film may have a tensile strength suitable to be applied as a packaging material.

The polyester film 100 of an embodiment may have an elongation of 60% or more, 70% or more, or 75% or more. The elongation may be 120% or less. When the elongation has different values in MD direction and TD direction, the elongation thereof refers to the average value thereof. The polyester film may have an elongation characteristic suitable to be applied as a packaging material.

The polyester film 100 of an embodiment may have a thermal shrinkage of 5% or less, 4% or less, or 3% or less. The thermal shrinkage may be 0.5% or more. This means that the polyester film has measurement stability of a certain level or more, and the present disclosure can have a stable thermal shrinkage characteristic.

The polyester film 100 of an embodiment may have a thickness of 1,000 μm or less, 800 μm or less, 600 μm or less, 400 μm or less, 200 μm or less, 100 μm or less, or 60 μm or less. The thickness may be 10 μm or more, or 15 μm or more. In such a case, the polyester film can have a thickness suitable to be applied as a packaging material.

The polyester film 100 of an embodiment may comprise a laminate formed by a first layer comprising lactic acid residues; and a second layer comprising terephthalate residues and adipic acid residues, alternately laminated therein, and when spinning of 180 degrees at 800 rpm is applied for 30 seconds, the polyester film may have a noise level of 80 dB or less, 77 dB or less, or 75 dB or less. At this time, the noise level refers to values respectively measured at 250 Hz, 500 Hz, 1000 Hz, 2000 Hz, 4000 Hz and 8000 Hz.

The polyester film has a low noise level overall in the range of various frequencies from a low-pitched sound, mainly perceivable to people, to a high-pitched sound, and therefore, it is possible to provide a polyester film which is eco-friendly and relatively quiet while having a mechanical strength of a certain level or more.

Manufacturing Method of Polyester Film

A manufacturing method of a polyester film, according to another embodiment, comprises an operation of preparing a composition, an operation of obtaining a non-stretched sheet; and an operation of obtaining a polyester film.

The operation of preparing a composition is an operation of preparing a first resin composition comprising lactic acid residues and a second resin composition comprising terephthalate residues and adipic acid residues (thereinafter, referred as the first operation).

The operation of obtaining a non-stretched sheet is an operation of respectively melting and extruding the first resin composition and the second resin composition to obtain a non-stretched sheet comprising a laminate formed by the first layer comprising the first resin and the second layer comprising the second resin alternately laminated (thereinafter, referred as the second operation).

The operation of obtaining a polyester film is an operation of stretching and thermally fixing the laminated sheet to obtain a polyester film (thereinafter, referred as the third operation).

The detailed descriptions of the polyester film and the laminate are overlapped with the above descriptions, and thus, further description is omitted.

The first resin composition may comprise the resin of the first layer described above, inorganic particles, additives, and the like. The second resin composition may comprise the resin of the second layer described above, additives, and the like.

The melt viscosity values of the first layer resin and the second layer resin at 210° C. are the same as described above, and when a resin having such a melt viscosity is applied to the first resin composition and the second resin composition, the laminate made from the compositions has an advantage in the manufacturing method applying an extruding method.

The first resin composition and the second resin composition may proceed an operation of removing moisture in the first operation and/or the second operation, and at this time, the moisture is desired to be 150 ppm or less.

An ordinary means for laminating a film, such as a feed block, may be applied to the second operation. For example, the mean for laminating a film may have a structure for discharging melt resins corresponding to the first layer and the second layer to be a laminate, and may additionally comprise a part for the resin of the skin layer to be extruded. Workability can be improved further when the first or second resin composition is applied as the skin layer. By controlling the discharge amount of the melt resin and the like, the thickness ratio of respective layers of the laminate and the thickness ratio of the skin layer may be controlled.

The thickness ratio and the like are the same as described above, and in consideration of a stretching process described below and the like, the thickness of each layer may be controlled to be applied.

In the second operation, the non-stretched sheet may be formed by sticking the non-stretched sheet to a cooling roll and the like.

The third operation may comprise an operation of stretching the sheet in a length direction and a width direction. After the stretching, an operation of thermal fixing may be comprised further.

As for the stretching, a biaxial stretching may be applied, or two step biaxial stretching may be applied. Specifically, the stretching may be performed as follows: preheating is performed for the sheet to have a temperature of 50° C. to 80° C., the sheet is stretched in the length direction (MD) to be two to four times longer at 40° C. to 100° C. and stretched in the width direction (TD) to be three to six times longer at 50° C. to 150° C.

The operation of thermal fixing may be performed at a temperature of 50° C. to 150° C., 70° C. to 150° C., 100° C. to 150° C., or 110° C. to 140° C.

Through stretching and thermal fixing, a polyester film can improve mechanical strength while having a thin thickness and measurement stability.

Packaging Material

The packaging material, according to another embodiment, comprises the polyester film described above. The detailed description on a polyester film is overlapped with the above description, and thus the further description is omitted.

The packaging material may be, for example, a packaging material for disposables and a packaging material for food, and the polyester film may be applied thereto as it is or may be applied with an aluminum foil, a color layer, and the like added to the film further.

The packaging material can decrease the problem of generating carbon dioxide due to a biodegradable resin applied thereto and has an eco-friendly characteristic because almost complete biodegradation is possible under a predetermined condition. In addition, while a polylactic acid resin to which researches have been tried as a conventional biodegradable film is applied, the noise level is lowered and mechanical strength and the like are maintained at a certain level or more in the packaging material, and due to a haze value of a proper level secured together with the above characteristics, the packaging material has great utilization.

Hereinafter, the present disclosure will be described in further detail with reference to accompanying examples. The following embodiments are only examples for understanding the present disclosure, and the range of the present disclosure is not limited to the same.

1. Manufacture of Polyester Film of Examples 1 to 2

The first resin composition was applied by a blended resin made from a polylactic acid-based polymer of 93.9 parts by weight, a polyhydroxyalkanoate-based polymer of 6 parts by weight, and calcium carbonate of 0.1 parts by weight, based on the first resin of 100 parts by weight.

Within the first resin, the polylactic acid-based polymer was applied by one comprising D-lactide in an amount of about 1 mol % to about 3 mol %, having a melt viscosity of about 7,000 P to about 12,000 P (poise) at 210° C., the polyhydroxyalkanoate-based polymer was applied by one comprising 4HB in an amount of 30 mol % to 35 mol %, and the calcium carbonate was applied by one whose grain size was expressed by $D_{50}$=1.5 μm.

As for the second resin, a polybutylene adipate-co-terephthalate resin having a melt viscosity of about 4000 P to about 7,000 P (poise) at 210° C. and aliphatic ingredients in the amount of 50 mol % within the acid ingredients was applied in the amount of 100 parts by weight, based on the second resin of 100 parts by weight.

The first resin was dried for 8 hours or more at 60° C. by a dehumidifying dryer, and the second resin was dried for 2 hours at 80° C. to remove moisture.

By using two extruders and a multilayer feed block alternately laminated to have layers in a predetermined number, the first resin was melted and extruded by one extruder with the temperature of 210° C. and the second resin was melted and extruded by the other extruder with the temperature of 210° C. The first resin and the second resin were applied in a discharge ratio (volume ratio) of 70:30.

Within the multilayer feed block, the first resin composition determined to be 36 layers and the second resin composition determined to be 36 layers were diverged and alternately laminated, the first layer and second layer were laminated to be total 72 layers, a skin layer was placed to the outermost layer of the top side and the outermost layer of the bottom side to have a thickness of about 10% to a total thickness, and to the skin layer, the first resin composition was applied for forming the same composition as the first layer. Thereafter, the compositions were stuck to a cooling roll maintained at 20° C., after passing through a die of 780 mm, and thereby a non-stretched multilayer sheet of 73 layers comprising the outermost layers (the portion where the skin layer and the first layer are adjacent is considered as one layer) was obtained.

After the non-stretched multilayer sheet was stretched to be three times longer in the length direction at 65° C. and stretched to be four times longer in the width direction at 85° C., and thermal fixing was performed at 120° C. to have a relaxation rate of 1% to manufacture a biaxial stretched multilayer film (Example 1).

Example 2 was manufactured to have the thickness of 25 μm after the stretching and thermal fixing, while manufactured in the same manner as Example 1.

2. Manufacture of Polyester Film of Examples 3 to 4

Example 3 was manufactured by the first resin composition and the second resin composition applied to be the same as the above, however, the discharge ratio (volume ratio) of the first resin composition and the second resin composition was applied to be 50:50.

Within the multilayer feed block, the first resin composition determined to be 36 layers and the second resin composition determined to be 36 layers were diverged and alternately laminated, the first layer and second layer were laminated to be total 72 layers, a skin layer was placed to the outermost layer of the top side and the outermost layer of the bottom side to have a thickness of about 8% to a total thickness, and to the skin layer, the first resin composition was applied for forming the same composition as the first layer.

Other processes were applied to be the same as the manufacture of Example 1, and thereby a biaxially stretched multilayer film of 20 μm (Example 3) was manufactured.

Example 4 was manufactured by the same processes as Example 3, and thereby a biaxially stretched multilayer film of 25 μm was manufactured.

Example 5 was manufactured as follows: the first resin composition determined to be 15 layers and the second resin composition determined to be 15 layers were diverged and alternately laminated within the multilayer feed block, the first layer and second layer were laminated to be total 30 layers, a skin layer was placed to the outermost layer of the top side and the outermost layer of the bottom side, and to the skin layer, the first resin composition was applied for forming the same composition as the first layer. A film of total 31 layers was manufactured, and the thickness of the film was 20 μm.

3. Manufacture of Polyester Film of Comparative Examples 1 to 4

Comparative Example 1 was made from a polylactic acid-based polymer having D-lactide in an amount of about 1% to about 3 mol % and a melt viscosity of about 7,000 to about 12,000 P at 210° C. The polymer was dried for 6 hours at 80° C. to remove moisture. The resin of the first resin layer was melted and extruded by an extruder to which a temperature of 210° C. was applied. After passing through a die of 780 mm, the resin was sticked to a cooling roll maintained at 20° C. to obtain a monolayer non-stretched sheet. The monolayer non-stretched film was stretched to be 3.0 times longer in the length direction at 65° C. and stretched to be 3.8 times longer in the width direction at 85° C., and after that, a temperature of 120° C. for thermal fixing and a relaxation of about 1% were applied to manufacture a biaxial stretched monolayer film.

Comparative Example 2 was made from a blended resin made from the polylactic acid-based polymer of 80 wt % and the second resin of 20 wt % which were used at Example 1, and the blending of the resin was performed by a twin-screw extruder at 200° C. The resin was dried for 8 hours at 60° C. by a dehumidifying dryer, and after that, melted and extruded at about 210° C. to manufacture a monolayer non-stretched sheet of 30 μm. This non-stretched sheet was applied as the film of Comparative Example 2.

Comparative Example 3 was manufactured as follows: hand mixing of polyhydroxyalkanoate of 10 wt % and the polylactic acid-based polymer of 90 wt %, which was used in the first resin, subsequent blending by a twin-screw extruder at 200° C. to shape the resin into a chip, and drying by a dehumidifying dryer for 8 hours or more at 60° C. were performed. Thereafter, the chip was melted and extruded by a single extruder, passed through a die of 780 mm, and was stuck to a cooling roll maintained at 20° C., and thereby a monolayer non-stretched sheet was obtained. The monolayer non-stretched sheet obtained in this manner was stretched to be 3.0 times longer in the length direction at 65° C. and to be 3.8 times longer in the width direction at 85° C., and after that, the temperature of 120° C. for thermal fixing and the relaxation of about 1% was applied to manufacture a biaxially stretched multilayer film of about 20 μm.

Comparative Example 4 was made from the resin of the first layer, which is a polylactic acid-based polymer having D-lactide in an amount of about 1 to 3 mol % and a melt viscosity of about 7,000 to 12,000 P at 210° C. and the resin of the second layer which is PBAT resin having a melt viscosity of about 4,000 to 7,000 P at 210° C. and aliphatic residues of 50 mol % within acid residues. The resin of the first resin was dried for 8 hours or more at 60° C. and the resin of the second resin was dried for 2 hours or more for removing moisture thereof. By using two extruders and a multilayer feed block for alternately laminating two type layers, the resin of the first resin was melted and extruded by an extruder with the temperature of 210° C. and the resin of the second resin was melted and extruded by an extruder with the temperature of 210° C. The discharge ratio (volume ratio) of 70:30 was applied for the first resin and the second resin. In the multilayer feed block, the first resin and the second resin were diverged to have 36 layers and 36 layers, respectively, and the first resin and the second resin were alternately laminated. To the outermost layer of an upper/lower side, the first resin was disposed to have a thickness of about 20% of a total thickness. Thereafter, the resins were sticked to a cooling roll maintained at 20° C. after passing through a die of 780 mm, and a non-stretched multilayer sheet of total 73 layers comprising the outermost layers (the portion where the first layer and the skin layer are directly contacted from each other does not have distinguishment of layers and is considered as one layer) was obtained. The non-stretched multilayer sheet obtained in this manner was stretched in 3.0 times longer in the length direction at 65° C. and 4.0 times longer in the width direction, and the temperature of 120° C. for thermal fixing and the relaxation of 1% were applied thereto, and thereby a biaxial stretched multilayer film of 20 μm was manufactured.

4. Evaluation of Properties

Noise Level Test of Film

In a polycarbonate box in the size of 650(W)*450(D)*500 (H), a film cut into the A4 size (210 mm×297 mm) was prepared, and a digital noise analyzer (model: CR-162C) available from Cirrus Research PIC was disposed. The noise analyzer was disposed at a position distant by about 10 cm from the prepared film, both ends of the film were held by a jig, and noise was generated by spinning of 180 degrees at 800 RPM for 30 seconds or more for measurement of noise. The analysis of data was made by application of equivalent noise level and noise level by frequencies of Noise Tools Software program. Through the program, the noise level for 30 seconds at a certain frequency, equivalent noise level, and the like were evaluated and the result was shown in Table below.

Evaluation of Mechanical Properties

After making a film specimen according to ASTM D882, it was cut to 150 mm in length and 15 mm in width. The specimen mounted to have a 50 mm interspinal spacing, the specimen was tested at a tensile speed of 200 mm/min using a tensile tester, Instron 5566A, and the linear slope value from the measurement start to the elongation of 3% was measured at Young's modulus, kgf/mm$^2$).

The tensile strength was measured using the same equipment as the maximum strength at the time of tensile strength (kgf/mm$^2$) and the elongation was increased (%) compared to the initial stage at the time of sample fracture.

Haze

Hazemeter (model: SEP-H) available from Nihon Semitsu Kogaku was used to measure haze in accordance with ASTM D1003 standard.

The results of respective measurements are arranged in Tables 1 and 2 below.

TABLE 1

| | | Example # | | | | |
|---|---|---|---|---|---|---|
| | | Example 1 | Example 2 | Example 3 | Example 4 | Example 5 |
| Film Thickness (μm) | | 20 | 25 | 20 | 25 | 20 |
| The Number of Skin Layers | | 2 | 2 | 2 | 2 | 2 |
| Set Number of Layers of First Layer/Second Layer | | 36 | 36 | 36 | 36 | 15 |
| Total Number of Laminated Layers | | 73 | 73 | 73 | 73 | 31 |
| Composition (wt %) | PBAT | 30 | 30 | 50 | 50 | 30 |
| | PLA | 65.73 | 65.73 | 46.95 | 46.95 | 65.73 |
| | PHA | 4.2 | 4.2 | 3.0 | 3.0 | 4.2 |
| | Inorganic Particles* | 0.07 | 0.07 | 0.05 | 0.05 | 0.07 |
| Noise Level (dB) | 250 Hz | 60.7 | 62.7 | 59.8 | 60.9 | 60.5 |
| | 500 Hz | 50.6 | 52.7 | 50 | 51.2 | 50.3 |
| | 1000 Hz | 54.8 | 58.2 | 54.3 | 55.7 | 54.4 |
| | 2000 Hz | 64.2 | 66.8 | 63.2 | 65.6 | 63.8 |
| | 4000 Hz | 72.1 | 74.2 | 70.2 | 72.4 | 71.8 |
| | 8000 Hz | 70.3 | 71.6 | 67.1 | 69.1 | 70.1 |
| Equivalent Noise Level (dB) | | 75.1 | 77.1 | 72.9 | 75.2 | 75.1 |
| Average Tensile Strength ($kgf/mm^2$) | | 9.95 | 9.3 | 5.5 | 4.3 | 10.3 |
| Average Elongation (%) | | 101.5 | 102.5 | 91.5 | 81 | 99 |
| Average Young's Modulus ($kgf/mm^2$) | | 274 | 268 | 122 | 158 | 262 |
| Haze (%) | | 7.5 | 8.9 | 6.9 | 7.6 | 9.3 |

*The inorganic particles within a composition are calcium carbonate.

TABLE 2

| | | Example # | | | | |
|---|---|---|---|---|---|---|
| | | Comparative Example 1 | Comparative Example 2 | Comparative Example 3 | Comparative Example 4 | Reference Example |
| Film Thickness (μm) | | 20 | 30 | 20 | 20 | Film of 20 μm Made from PET of 100% |
| The Number of Skin Layers | | Monolayer | Monolayer | Monolayer | 2 | |
| Set Number of Layers of First Layer/Second Layer | | — | — | — | 36 | |
| Total Number of Laminated Layers | | 1 | 1 | 1 | 73 | |
| Composition (wt %) | PBAT | 0 | 20 | — | 30 | |
| | PLA | 99.9 | 80 | 90 | 69.93 | |
| | PHA | 0 | 0 | 10 | 0 | |
| | Inorganic Particles | 0.1 | — | — | 0.07 | |
| Noise Level (dB) | 250 Hz | 62.7 | — | 61 | — | 64 |
| | 500 Hz | 52.8 | — | 51.1 | — | 53.7 |
| | 1000 Hz | 59.1 | — | 56.1 | — | 59.0 |
| | 2000 Hz | 69.1 | — | 65.8 | — | 67.1 |
| | 4000 Hz | 78 | — | 73.8 | — | 73.8 |
| | 8000 Hz | 77.3 | — | 82.2 | — | 71.7 |
| Equivalent Noise Level(dB) | | 81.2 | 80 | 76.8 | 79.8 | 78 |
| Average Tensile Strength ($kgf/mm^2$) | | 15.25 | 4.2 | 15.1 | 10 | 27.5 |
| Average Elongation (%) | | 134 | 293 | 111 | 110 | 136 |
| Average Young's Modulus ($kgf/mm^2$) | | 384 | 173 | 339 | 288 | 397 |
| Haze (%) | | 1.5 | 25 | 11.4 | 4 | 2.7 |

*The inorganic particles of Comparative Example 1 and Comparative Example 4 were silica.

Comparative Example 1 was a film made from PLA alone, and it is reconfirmed that the film had and an equivalent noise level of 80 dB or more and exhibited a somewhat noisy characteristic. The Young's modulus value of the film was also relatively large, and flexibility of the film was degraded slightly.

Comparative Example 2 was a film made from the blended resin of PBAT added to PLA, differently from Comparative Example 1, and the equivalent noise level of the film was maintained at 80 dB thereby generating laud noise even though the flexibility of the film was improved. The haze value of the film was also greatly increased. This is thought as the result caused from low compatibility of the above two resins.

Comparative Example 3 was a film made from the resin blended by PLA and PHA, the Young's modulus of the film was 300 kgf/mm$^2$ or more, exhibiting somewhat insufficient flexibility, and the haze value of the film was also evaluated as a relatively large value.

Comparative Example 4 is a film made by a structure of alternately laminated PLA and PBAT, differently from Comparative Example 3 made from PHA blended to PLA, and because having a relatively low haze value compared to other Comparative Examples, has an advantage in transparency for transmission of light. However, the film has still high equivalent noise level and Young's modulus.

The cases of Examples exhibited a tendency of lowering the equivalent noise level of each film, and the haze value thereof was ascertained as a low value.

In the Example 1 to Example 4, it was ascertained that each polyester film had an equivalent noise level of 80 dB or less, Young's modulus of 300 kgf/mm$^2$ and a haze of 10% or less at the same time.

All the resins of Examples and Comparative Examples were manufactured from biodegradable resins, and in the resins, the degree of noise occurrence, which had been considered as a weakness of conventional biodegradable film, was decreased, while the biodegradable characteristic was obtained.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A polyester film, comprising:

a laminate comprising alternating first layers and second layers, wherein each of the first layers comprises lactic acid residues and hydroxyalkanoate residues including both 4-hydroxybutylate residues (4HB residues) and 3-hydroxybutylate residues (3HB residues), and each of the second layers comprises terephthalate residues and adipic acid residues, wherein the 4HB residues are present in an amount of 30 mol % to 35 mol % based on a total amount of the hydroxyalkanoate residues, wherein the hydroxyalkanoate residues account for 1 to 7 parts by weight per 100 parts by weight of the lactic acid residues, wherein each of the second layers comprises a polybutylene adipate-co-terephthalate (PBAT) resin, wherein each of the first layers has a melt viscosity of 5,000 to 14,000 poise at 210° C. and each of the second layers has a melt viscosity of 3,000 to 9,000 poise at 210° C., wherein the polyester film has an average equivalent noise level of 78 dB or less from a noise level test by spinning the polyester film 180 degrees at 800 rpm for 30 seconds or more, wherein the polyester film has Young's modulus of 80 kgf/mm$^2$ or more and 280 kgf/mm$^2$ or less, wherein the polyester film has a haze of 10% or less, wherein the laminate has 36 or more and 224 or less layers of the first layers and the second layers, and wherein the laminate has a noise level of 67 dB or less at 2,000 Hz from the noise level test and 75 dB or less at 4,000 Hz from the noise level test.

2. The polyester film of claim 1, wherein the polyester film has the noise level of 63 dB or less at 250 Hz from the noise level test when the laminate has a thickness of 16 μm.

3. The polyester film of claim 1, wherein the polyester film has the haze of 2% or more and 9% or less.

4. The polyester film of claim 1, wherein the polyester film has the noise level of 53 dB or less at 500 Hz from the noise level test when the laminate has a thickness of 16 μm.

5. The polyester film of claim 1, wherein the laminate has 144 or less layers of the first layers and the second layers.

6. The polyester film of claim 1, wherein an average thickness ratio between each of the first layers and each of the second layers of the laminate ranges from 1:0.2 to 1.5.

7. The polyester film of claim 1, wherein the polyester film further comprises a skin layer disposed on opposing sides of the laminate, and wherein the skin layer comprises a first resin comprising lactic acid residues and inorganic particles.

8. A packaging material comprising the polyester film of claim 1.

9. A polyester film comprising:

a laminate comprising alternating first layers and second layers, wherein each of the first layers comprises lactic acid residues and hydroxyalkanoate residues including both 4-hydroxybutylate residues (4HB residues) and 3-hydroxybutylate residues (3 HB residues), and each of the second layers comprises terephthalate residues and adipic acid residues, wherein the 4HB residues are present in an amount of 30 mol % to 35 mol % based on a total amount of the hydroxyalkanoate residues, wherein the hydroxyalkanoate residues account for 1 to 7 parts by weight per 100 parts by weight of the lactic acid residues, wherein each of the second layers comprises a polybutylene adipate-co-terephthalate (PBAT) resin, wherein each of the first layers has a melt viscosity of 5,000 to 14,000 poise at 210° C., and each of the second layers has a melt viscosity of 3,000 to 9,000 poise at 210° C., wherein the polyester film has a noise level of 80 dB or less at 250 Hz, 500 Hz, 1000 Hz, 2000 Hz, 4000 Hz and 8000 Hz from a noise level test by spinning the polyester film 180 degrees at 800 rpm for 30 seconds or more, wherein the laminate has 36 or more and 224 or less layers of the first layers and the second layers, and wherein the laminate has a noise level of 67 dB or less at 2,000 Hz from the noise level test and 75 dB or less at 4,000 Hz from the noise level test.

10. A packaging material comprising the polyester film of claim 9.

11. The polyester film of claim 9, wherein the polyester film has Young's modulus of 280 $kgf/mm^2$ or less and a tensile strength of 5 $kgf/mm^2$ or more and 12 $kgf/mm^2$ or less.

* * * * *